Jan. 7, 1964 J. B. BEYER ETAL 3,117,276
THICKNESS MEASURING METHOD AND APPARATUS EMPLOYING MICROWAVES
Filed June 28, 1960 4 Sheets-Sheet 3
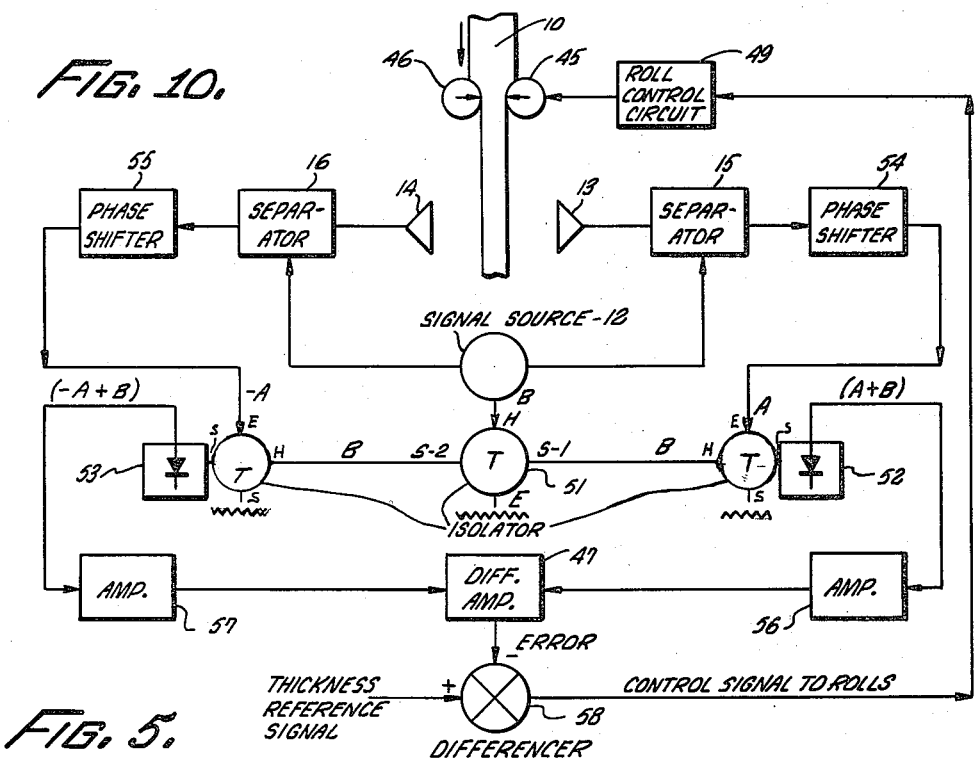
FIG. 10.
FIG. 5.
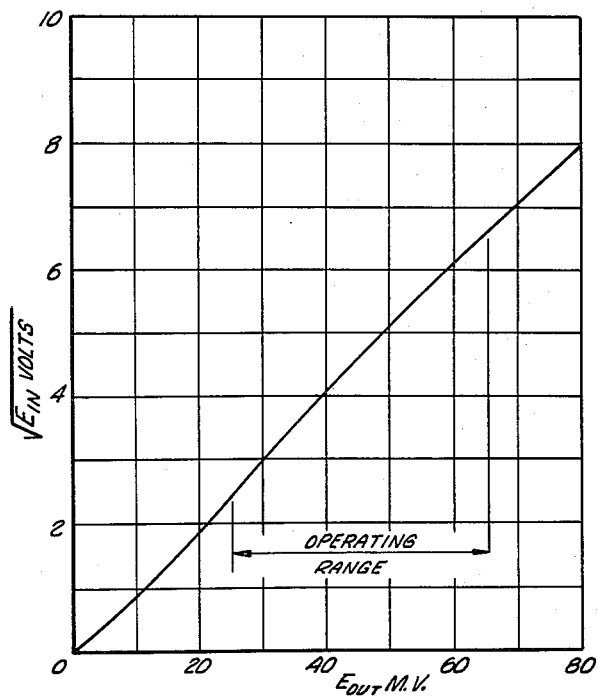
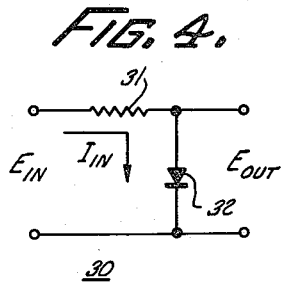
FIG. 4.
INVENTORS.
JAMES B. BEYER
HAROLD A. PETERSON
JEAN G. VAN BLADEL
BY
ATTORNEYS.

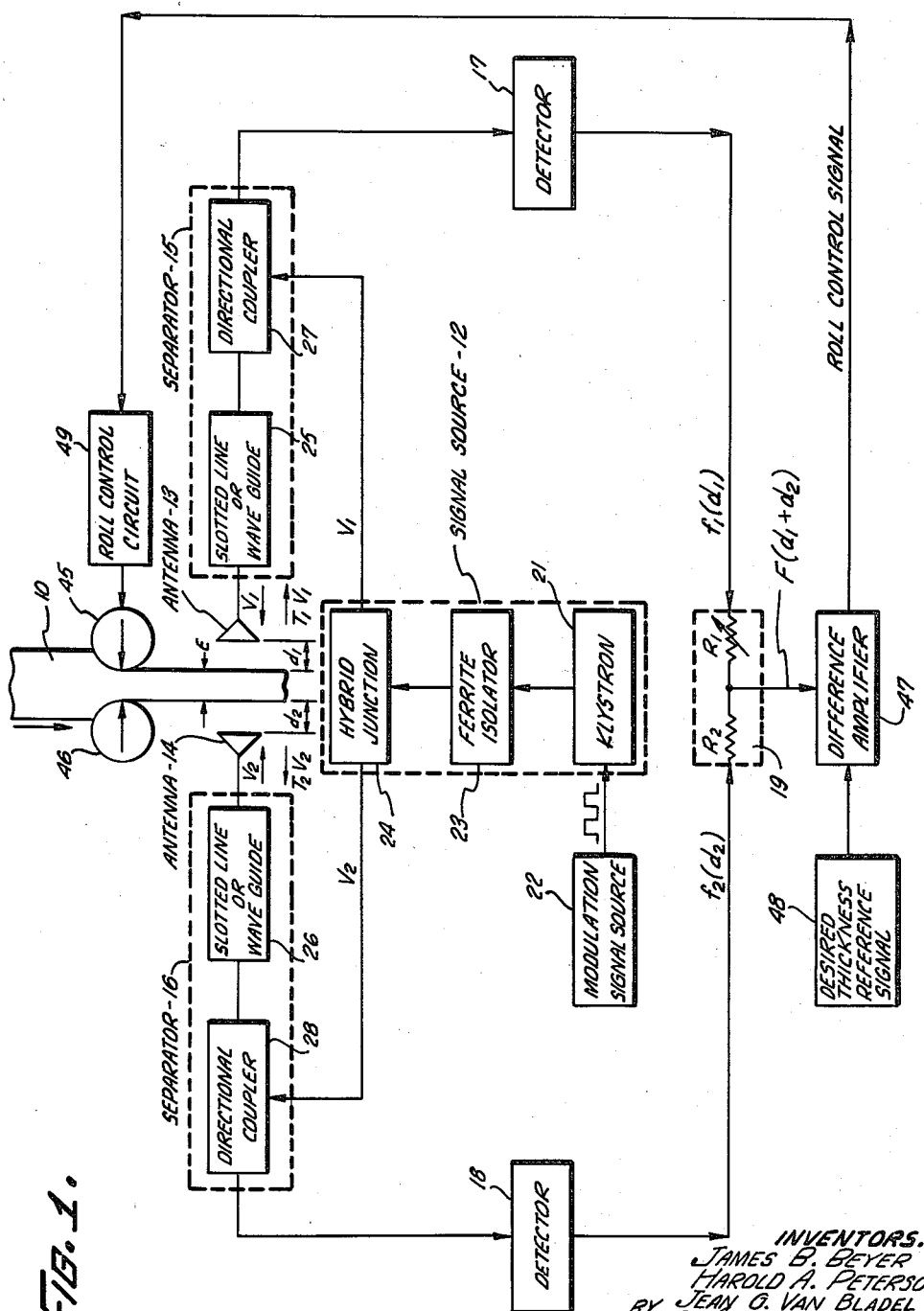

United States Patent Office 3,117,276
Patented Jan. 7, 1964

3,117,276
THICKNESS MEASURING METHOD AND APPARATUS EMPLOYING MICROWAVES
James B. Beyer, Harold A. Peterson, and Jean G. Van Bladel, Madison, Wis., assignors to Wisconsin Alumni Research Foundation, Madison, Wis., a not for profit corporation of Wisconsin
Filed June 28, 1960, Ser. No. 39,303
14 Claims. (Cl. 324—58.5)

This invention relates to methods and apparatus for measuring the thickness of materials and more particularly to microwave circuits for continuously measuring and controlling the thickness of a moving material.

Various methods of measuring the thickness of materials, stationary or moving, have been employed in the past. The problem in measuring the thickness of a material that is moving is typified by the control of a continuously moving sheet of steel strip in a rolling mill. In general, in both hot and cold rolling steel mills, a sheet of steel to be reduced in thickness is passed between a pair of rolls having a preselected separation related to the desired steel thickness. Therefore, the variations in the separation of the rolls from the preselected separation has a direct relationship on the thickness of the steel and the variations of the steel strip emerging therefrom. In the steel industry these measurements and controls have been effected in the past by means of measuring the amount of beta radiation absorption as an indication of the thickness of a steel strip or the inclusion in a capacitance bridge of a capacitor formed by the material under measurement and a fixed capacitor plate. A very popular method of measurement in the steel industry involves the use of X-ray absorption. This latter method of measurement depends on the measurement of absorption of the radiation and consequently the composition of the material undergoing measurement must be accurately known. This, then, places an important restriction on this method of measurement. In addition, bulky, expensive, and considerable electronic equipment for the detector and X-ray source is required.

This invention provides improved and simple thickness measuring methods and apparatus and which methods and apparatus are incorporated in a control system for continuously monitoring and maintaining the thickness of the material undergoing measurement within preselected tolerances. This method of measure provides a compact, inexpensive system resulting in excellent sensitivity and rapid response. The improved method and apparatus of this invention measures the thickness of a material possessing good reflecting properties at microwave frequencies and utilizes microwave techniques to effect the measurement without any contact of the material being measured and not dependent on the position of the material under measurement, or its composition, surface conditions, and translatory motion. When the methods of this invention are employed in a control system, the resulting system is advantageously characterized by excellent sensitivity and rapid response to effect any correction indicated by the error measuring system.

This invention comprises separate means such as microwave antennas for radiating a microwave signal towards opposite sides of the material to be measured or a reflecting surface and for receiving the reflected signal therefrom. The reflected signals are employed in separate microwave measuring systems for measuring the thickness of the material undergoing measurement when the distance between the antennas is known. These reflected signals are separated fom their transmitting signals and applied to appropriate detectors to provide signals having information indicative of the distance between the adjacent antenna and the material undergoing test. This pair of signals may then be combined in a mixer or adder to produce a resultant signal that is a function of the sum of the distances between the antennas. This arrangement therefore defines an improved measuring arrangement and gauge that may be utilized in various control systems.

In one embodiment of the invention the incident signal is a modulated signal and the distance information is extrated from the amplitude of the reflected signal to provide the distance information. When the amplitude method is utilized and a crystal detector provides the distance information, a square root correction network may be utilized in combination with the crystal detectors to correct for the square law characteristic of the crystal and thereby allow an increased operating range.

In another embodiment of the invention the linear operating range may be increased by utilizing superheterodyne techniques. In this particular embodiment the incident signal is an unmodulated signal and is utilized in combination with the signal provided by a local oscillator to eliminate the square law characteristic of the crystal detector.

In still another embodiment of the invention the distance information may be derived from the reflected signals by detecting the phase difference of the two signals in the same general arrangement as utilized in the amplitude detection arrangement. Both of the amplitude and phase detection arrangements may be employed in a feedback control or closed loop circuit to continuously measure and monitor a continuously advancing sample, as in a steel rolling mill.

These and other features of the present invention may be more fully appreciated when considered in the light of the following specification and drawings, in which:

FIG. 1 is a block diagram of a control arrangement embodying the invention;

FIG. 4 is a schematic representation of the square root correction network for use in the system of FIG. 1;

FIG. 5 is a graphic representation of the input versus output voltage characteristic of the network of FIG. 4;

FIG. 10 is a block diagram of a modified control arrangement operating on the phase relationship of the reflected signals.

Figure 8:
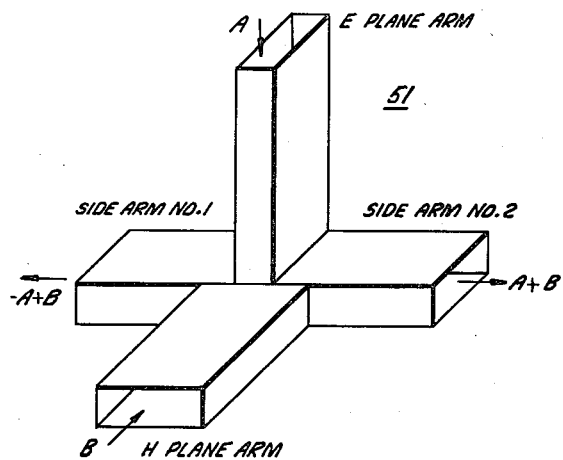
FIG. 8 is a perspective view of a phase detector or discriminator for use in the system of FIG. 10.

The basic arrangement of the invention for measuring or gauging the thickness of a sample of a material to be measured, such as the steel strip shown in FIG. 1, will now be examined. The invention utilizes two independent microwave measuring systems for measuring the distance from fixed microwave antennas or feed horns to each side of the material to be measured. The material to be measured is subjected to the microwave radiation from the antennas whereby the energy is reflected on opposite sides of the material and only the reflected radiation is applied to individual microwave measuring systems. As indicated in FIG. 1, the incident waves $V_1$ and $V_2$ are related to the reflected waves by a complex reflection coefficient $\Gamma_1$ and $\Gamma_2$, respectively. Both $\Gamma_1$ and $\Gamma_2$ depend on the respective distances $d_1$ and $d_2$, in phase and amplitude. The distances $d_1$ and $d_2$ are the distances between the reflecting surface of the material and the antenna from which the incident radiation is derived. Therefore, the reflected signals $\Gamma_1 V_1$ and $\Gamma_2 V_2$ have phase and amplitude characteristics that contain information that is directly related to the distances $d_1$ and $d_2$. By applying the reflected signals $\Gamma_1 V_1$ and $\Gamma_2 V_2$ to an appropriate detector, the distance information contained therein may be extracted from the reflected signals to independently measure the distances $d_1$ and $d_2$.

The detectors utilized for this purpose must have a linear region in their transfer characteristic and the detectors must be operated over this linear portion in order that the output signal from the detector may truly represent the distances $d_1$ and $d_2$ with changes in thickness of the material undergoing measurement or test. This condition of operation is necessary since operation in the non-linear range will result in an output indication not only for changes in thickness but also for changes in position of the sample undergoing measurement. Assuming the thickness of the material undergoing measurement is represented by $\epsilon$, any changes in thickness, $\Delta\epsilon$, will change the distance $d_1 + d_2$ by $-\Delta\epsilon$. Therefore, by combining the quantities or signals representative of the distances $d_1$ and $d_2$ so that the resultant depends on the sum of $d_1$ and $d_2$ only, this resultant will then provide a direct measure of the changes in thickness, $\epsilon$. This resultant quantity will also be independent of any change in the position of the sample between the antennas since the sum of the distances $d_1 + d_2$ will remain a constant with the changes in position of the sample.

General considerations, therefore, lead to the conclusion that the thickness of a sample may be measured or, with a known thickness, the relative distances between the sample and the antennas may be determined by the double reflection of microwave signals from opposite surfaces of the sample. The desired information is represented by the phase and amplitude of the two reflected signals and, therefore, the desired information may be derived either by detecting the amplitude characteristics of the reflected signals, the phase relationship of the reflected signals, or a combination of both.

The measuring apparatus of the present invention will now be described in more detail by reference to FIG. 1 wherein the invention is illustrated for detecting the amplitude characteristic of the reflected waves to extract the desired information and employing a modulated incident signal. The material under measurement, or the element having the necessary reflecting surfaces, is identified by the reference character 10. for the present, the material 10 will be assumed to be in a stationary position.

The material 10 receives the microwave energy or radiation derived from a signal source 12, shown in dotted outline. The signal source 12 is coupled to a pair of microwave antennas 13 and 14 by means of individual separators 15 and 16. The reflected energy derived from the separators 15 and 16 is applied to the individual amplitude detectors 17 and 18. The output signals from the detectors 17 and 18 are, in turn, combined in a mixer 19 providing the necessary distance or thickness information signal.

The material 10 undergoing measurement or test is characterized as a substantially perfect reflecting surface and, therefore, must have a negligible penetration to the microwave energy. Most of the metallic surfaces, including the steel strips used in hot and cold rolling mills, provide this characteristic.

The signal source 12 comprises a microwave signal generator shown as a klystron 21. The klystron 21 provides a modulated output signal through the provision of a modulating signal source 22 coupled to the repeller electrode of the klystron 21. The klystron 21 provides a signal on the order of 9,150 megacycles and is modulated by a 1,000 cycle pulse signal from the modulation signal source 22. In order to allow the detectors 17 and 18 to operate over their linear range, the frequency of the klystron 21 should be maintained within a few megacycles. This frequency stability is obtainable by a commercially available 2K25 reflux klystron having a standard regulated power supply. The modulated output signal from the klystron 21 is coupled to a ferrite isolator 23 functioning to prevent frequency pulling of the klystron 21 by the reflected signal in the separators 15 and 16. The remaining element comprising the signal source 12 is a hybrid junction 24. The hybrid junction 24 is provided to effect isolation between the two independent microwave systems measuring the distances $d_1$ and $d_2$. The hybrid junction 24 is connected to be responsive to the output signal from the ferrite isolator 23 and delivers the mircowave energy to the separators 15 and 16. The microwave energy is coupled to the antennas 13 and 14 by means of the separators 15 and 16.

Figure 2:
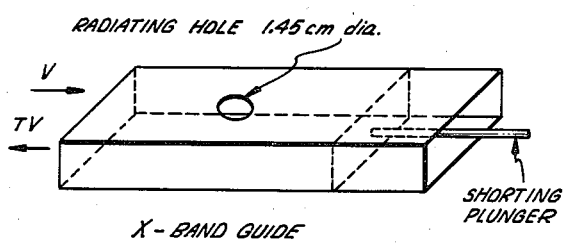
FIGS. 2 and 3 are perspective views of slot antennas and dielectric antennas respectively for use in a system of the type of FIG. 1.
Figure 3:
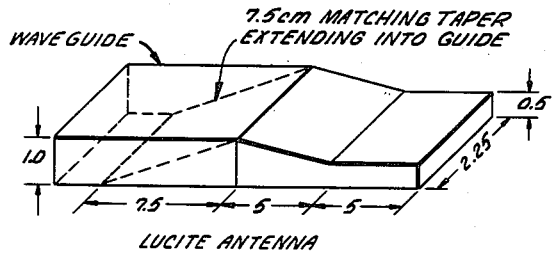

The antennas 13 and 14 are arranged on opposite sides of the material 10 to direct or transmit the microwave energy to the adjacent reflecting surfaces thereof. The antennas 13 and 14 are of identical and conventional horn-type radiators. The characteristic for the antennas 13 and 14 that is required, for the purposes of this invention, is a linear portion in their amplitude versus distance characteristic. The horn radiators should be capable of providing a narrow beam of radiated energy and recovering as much of the radiated energy as possible and to obtain a well defined variation of the reflected signal with distance. Several types of antennas are known to comply with these requirements and were described in 1948 in an article by R. B. Watson and C. W. Horton, appearing in Journal of Applied Physics, volume XIX, page 661. A slotted antenna similar to the one shown in FIG. 2 has been found to have a linear range of about 1.5 millimeters and its compact construction has been found to be satisfactory. Other antennas described in the above-identified publication possess slightly larger linear ranges but are bulkier. The dielectric or lucite antenna illustrated in FIG. 3 is an example of these types of antennas.

The separators 15 and 16 each comprise a wave guide or slotted line 25 and 26 coupled between the antennas 13 and 14 and an individual directional coupler 27 and 28 respectively. The wave guides 25 and 26 couple the microwave energy, $V_1$ and $V_2$, from the signal source 12 to the respective antennas 13 and 14 as received from their respective directional couplers 27 and 28. The reflected waves detected by the antennas 13 and 14 are, in turn, delivered by the respective wave guides 25 and 26 to their directional couplers 27 and 28. The directional couplers are well-known in the art and the couplers 27 and 28 separate the reflected signal from the incident signal, or signal to be transmitted, and hence the only microwave energy coupled to the detectors 17 and 18 is due to the reflected signal.

The detectors 17 and 18 may be standard microwave crystals, commercially identified as 1N23B crystals, and arranged in standard microwave crystal mounts. As is well-known, the crystal detectors operate on the square law characteristic and, therefore, the output signals thereof are non-linear. The detectors, however, do have a linear range and, as long as they are operated in this linear range, only the thickness changes, $\Delta\epsilon$, will be produced therefrom. This linear region has been determined to be on the order of two millimeters and has produced satisfactory results without correction therefor. In addition, it should be noted that, in view of their square law property, the output signals that are produced from the detectors 17 and 18 are proportional to the square of the distances $d_1$ and $d_2$.

The mixer 19 receives the two distance signals from the detectors 17 and 18 and combines them to produce a signal that is a function of the sum of the distances $d_1$ and $d_2$. The mixer 19 may take many forms and a convenient arrangement for the purposes of this invention is a resistance adder having an adjustable leg. The resistance adder comprises the fixed resistor $R_2$ and the variable resistor $R_1$ respectively responsive to the detectors 18 and 17. The currents flowing in the resistors $R_1$ and $R_2$ are proportional to the distances $d_1$ and $d_2$ and, accordingly, the sum or output current will be proportional to $I_1 + \eta I_2$ wherein $\eta$ is equal to $$\frac{R_2}{R_1}$$

The value of $R_2$ may be adjusted whereby equal changes in the distances $d_1$ and $d_2$ produce equal outputs.

It should now be evident that the modulated microwave energy is radiated in a narrow pattern towards the material 10 and reflected therefrom and received by the same antennas and, as a result of the separation of the signals provided by the directional couplers 27 and 28, the reflected signals $\Gamma_1 V_1$ and $\Gamma_2 V_2$ are applied to the respective crystal detectors 17 and 18. As long as the klystron 21 is maintained within its frequency limits and the detectors 17 and 18 are operated on the flat portions of their translation curve, an output signal which is a linear function of the thickness $\epsilon$ of the material 10 will be provided to the mixer 19. The combining of this pair of signals by the mixer 19 produces a resultant signal that is indicative of the thickness $\epsilon$ of the material. The limitation on the above-described device is the result of the square law characteristic of the detectors 17 and 18 and, if improved results are desirable or necessary, a different mode of operation or correction for the square law characteristic of the detectors 17 and 18 is necessary.

To improve the operation of the measuring apparatus by compensating for the square law characteristic of the detectors 17 and 18, a square root device may be incorporated into the measuring apparatus of FIG. 1 to be responsive to the signals from the detectors 17 and 18. A very simple square root device 30 is shown in FIG. 4 and its accompanying transfer function is shown in FIG. 5. The square root device 30 comprises a resistor 31 connected in series with a crystal rectifier 32. The resistance value of the resistor 31 is on the order of 10,000 ohms and is much larger than the forward resistance of the 1N34A crystal 32. This resistance relationship causes the input current to the device 30 to be linearly related to the input voltage. Under these conditions the output voltage becomes proportional to the square root of the input current because of the crystal's square law characteristic. Therefore, the output voltage $E_{out}$ is proportional to the square root of the input voltage $\sqrt{E_{in}}$. The operating range for the square root device 30 may be seen by reference to FIG. 5 to be more than adequate for the purposes of this invention. Accordingly, by employing the square root device 30 in the arrangement of FIG. 1, the overall amplitude versus distance characteristic of the detectors 17 and 18 become linear.

Figure 6:
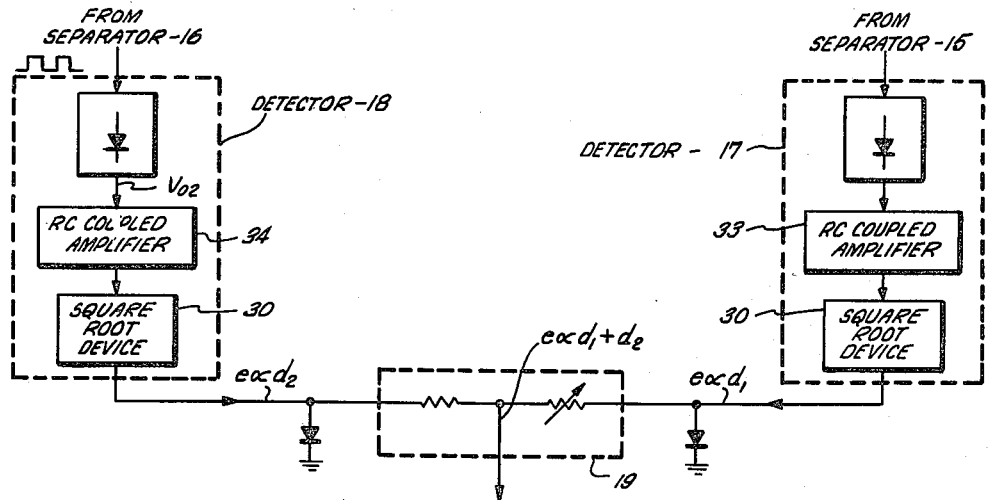
FIG. 6 is a schematic block diagram of a modified detector arrangement for use in the system of FIG. 1 utilizing the square root network of FIG. 4.

Now referring to FIG. 6, the portion of the system of FIG. 1 including the square law compensated arrangement will be described. The arrangement of FIG. 6 merely indicates the modified construction for the detectors 17 and 18 to incorporate the square root device 30 therein. The detectors 17 and 18 employ the same crystals as described hereinabove to detect the reflected signal and which amplitude varying reflection signals are applied to resistance capacitance coupled amplifiers 33 and 34. The amplifiers 33 and 34 may be two-stage conventional RC coupled amplifiers having their second stages coupled to the square root devices 30. It should now be apparent that the voltages derived from the detectors 17 and 18, in accordance with the arrangement of FIG. 6, are linearly related to the distances $d_1$ and $d_2$. These voltages are then applied to the mixer 19 to produce the output signal proportional to the sum of the distances $d_1 + d_2$. It has been found that the utilization of the square root device 30 provides an increase of approximately three times in the width of the linear range of the measuring apparatus as contrasted with the operation without the use of the square root devices 30.

Figure 7:
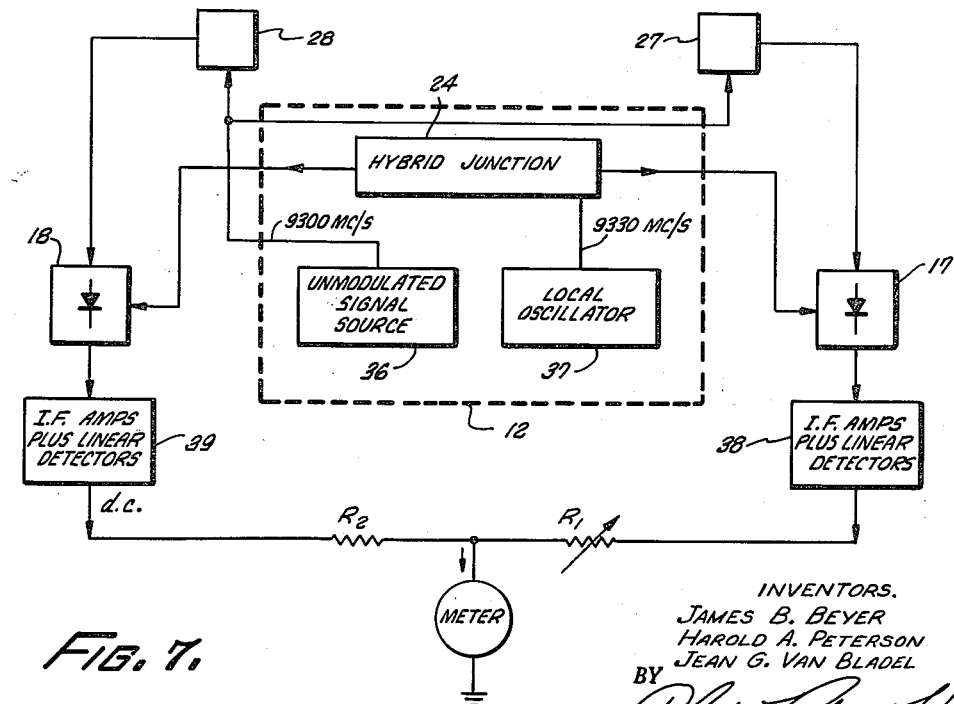
FIG. 7 is a schematic block diagram of a superheterodyne control arrangement of the type of FIG. 1.

The undesirable effect of the square law characteristic of the crystal detectors 17 and 18 may be eliminated by employing an unmodulated incident signal along with the superheterodyne detection in an arrangement similar to the one shown in FIG. 7. Under this method of operation the signal source 12 comprises an unmodulated signal source 36 which may be the same klystron as provided for the source 21 but, in this instance, the microwave energy is provided at 9,300 megacycles per second. The unmodulated microwave energy is applied to the directional couplers 27 and 28 as in the previous embodiments. A microwave signal of 9,330 megacycles per second derived from a local oscillator 37 is applied to a hybrid junction 24 to isolate the detectors 17 and 18 from each other, while allowing them to each be responsive to the output signal provided by the local oscillator 37. The output signals from the detectors 17 and 18 are the difference frequency, 30 megacycles, and are applied to intermediate frequency amplifiers 38 and 39 arranged in combination with linear detectors. The direct current signals provided at the output circuits of the linear detectors are combined in the resistance adder or mixer 19. Since the detection at the output of the IF amplifiers 38 and 39 are at a high level, the desired linear amplitude versus distance characteristic is maintained.

It should be noted that the main advantage of the superheterodyne method is the elimination of the square law characteristic of the crystal detectors since an increase in width of linear range of operation does not occur. It should also be noted that the extent of the linear region of the amplitude versus distance characteristic is not a function of the square root device 30 and, therefore, the superheterodyne method offers no advantage over the direct amplitude detection method. In some instances it may be found to be disadvantageous to employ the superheterodyne technique because of the noise added by the amplifiers and the drift of the two klystrons 36 and 37.

Now returning to FIG. 1 the amplitude detecting arrangement as applied to a control system for continuously measuring and monitoring the reduction rolls for a sheet of strip steel will be described. The strip steel is identified by the reference character 10 and is continuously advanced through a pair of rolls 45 and 46 spaced apart a distance corresponding to the desired thickness for the material or steel strip 10. It should be noted that although the description will continue with regard to the direct amplitude detection method, the same system is applicable to the arrangement utilizing the square root correction network and the superheterodyne method described hereinabove.

When the system of FIG. 1 is utilized to control the thickness of the material 10 and thereby the spacing of the rolls 45 and 46, it is desired to space the microwave antennas as close as possible to the point of contact between the material 10 and the rolls 45 and 46. To this end, the compactness of the slot antenna of FIG. 2 allows it to be spaced close to the rolls 45 and 46. This, therefore, minimizes the transport time lag and sheet translation errors. To provide a feedback control signal, the output signal derived from the mixer or the resistance adder 19 proportional to the distances $d_1$ and $d_2$ is applied to a difference amplifier or comparison device 47. The difference amplifier 47 is also connected to be responsive to a reference signal provided by the reference source shown in block form and identified by the reference character 48. The reference signal provided by the source 48 is representative of the desired thickness $e$ for the material 10. It will be recognized that although the reference signal source 48 is shown as a separate block, it may be derived directly from the klystron 21. When the reference signal is provided in this fashion, the effects of unwanted amplitude variations in the klystron output are reduced and also provides a zero output signal for some desired nominal thickness for the strip 10. The magnitude of the nominal thickness is unimportant as long as it does not approach the skin depth.

The difference or error signal provided by the amplifier 47 is applied to a roll control circuit shown in block form and identified by the reference character 49. The roll control circuit 49 functions to change the position of the rolls in accordance with the error signal to the position of the rolls 45 and 46 to thereby produce the desired thickness for the sheet steel 10.

It should now be apparent from the above description that, as the material 10 is continuously advanced through the rolls 45 and 46, the thickness of the material is continually measured and the position of the rolls adjusted, when necessary, to correct for any variations in thickness from the desired thickness. The sheet steel is radiated with the microwave energy from the antennas 13 and 14 and the pair of reflected waves from the opposite surfaces of the steel strip 10 are coupled to the detectors 17 and 18 to produce the independent distance signals proportional to the distances $d_1$ and $d_2$. The distance signals are then combined in the mixer 19 to produce a signal that is the function of $(d_1+d_2)$ and compared in the difference amplifier 47 with the signal representative of the desired thickness. Any measured deviation from the desired thickness will cause an error signal or control signal to be applied to the roll control circuit 49 to provide the adjustment for the rolls 45 and 46 and thereby continuously maintain the steel strip 10 at the desired thickness. Ideally, when the measured thickness and the desired thickness are equivalent, the difference amplifier 47 will provide a zero signal. To this end, the above system has been used wherein a constant thickness sheet traveling between dielectric antennas at one-half meter per second gave no output variation, while thickness changes of one-fortieth of a millimeter were clearly detected. It was further found that both the composition and the surface conditions of the material undergoing measurement were relatively unimportant and that translations of the sample by 1.5 millimeters or less yielded no change in output.

The reflected signals $\Gamma_1 V_1$ and $\Gamma_2 V_2$ were described hereinabove as containing the desired distance information and that either the phase or the amplitude of these signals may be independently detected in order to provide the desired output indication. By utilizing a system analogous in principal to the amplitude detecting systems described hereinabove, the distances $d_1$ and $d_2$ may be independently measured by means of the phase relationships of the two reflected signals. The reflected waves are applied to separate phase detectors to extract the desired phase information and the resulting output signals are then applied to a mixer or adder circuit as described for the amplitude detection arrangement. The phase detectors, ideally, should be amplitude insensitive.

Figure 8A:
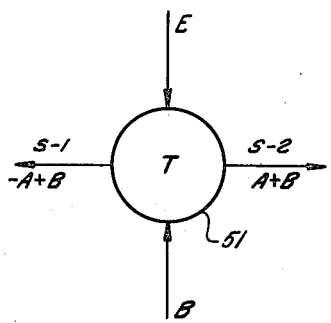
FIG. 8a is a schematic representation of the phase detector arrangement of FIG. 8.

A phase sensitive detector or phase discriminator for the purposes of this invention is more complex than the microwave crystal amplitude detector. A phase detector 51 which has been successfully employed is a variation of the hybrid junction detector. The phase detector 51 is shown in FIG. 8 and the schematic representation thereof is shown in FIG. 8a. The phase detector 51 comprises a pair of arms arranged at right angles to one another, the vertical arm is identified as the E plane arm, while the horizontal arm is identified as the H plane arm. Between the E and H plane arms and arranged in the same horizontal plane as the H plane arm and in a 90 degree relationship with each of the E and H plane arms are a pair of side arms, identified as side arm one and two, shown respectively to the left and right of the E plane arm.

The operation of the phase detector 51 will now be described, assuming a reference phase signal B is applied to the H plane arm and it is desired to measure the changes in the phase of a variable signal A. The signal A is applied to the E plane arm and is assumed to be adjusted to an angle of 90 degrees with respect to the signal B and the side arm one and thereby assumes an angle of (90+180) degrees with respect to the signal B in the side arm two because of the properties of the hybrid junction. The phasor diagram shown in FIG. 9 graphically illustrates the assumed relationship of the signals A and B and the magnitude of the phasors $(A+B)$ and $(-A+B)$ and that these latter two signals are equal in magnitude. Therefore, when the phasors have equal magnitudes, the crystal detectors to which these signals are applied will have equal output signals, assuming the crystal characteristics to be identical. It should be noted that the magnitudes of these two output signals will remain equal to each other regardless of the changes in magnitudes of the signals A and B, as long as the assumed 90 degree phase angle relationship is maintained between the signals. A comparison of these two output signals $(A+B)$ and $(-A+B)$, in a balanced difference amplifier will produce a zero output signal. If the phase angle of the signal A decreases, a reference to the phasor diagram of FIG. 9 indicates that the magnitude of the signal of $(A+B)$ will increase, while that of the corresponding signal $(-A+B)$ decreases. Upon comparison in a balanced difference amplifier, an output signal of a given polarity will be produced indicative of the decrease of phase angle of the signal A. If the phase of the signal A increases rather than decreases, the magnitude of the combination $(A+B)$ decreases, while that of the combination $(-A+B)$ increases and, again, a comparison of of these signals in a difference amplifier produces an output which will be of the opposite polarity from the output signal produced when the phase angle of the signal A decreases and thereby indicating the increase in phase angle A. Therefore, it is apparent that the phase detector or phase discriminator 51 detects and indicates not only the magnitude but also the direction of the phase shift between a pair of applied signals.

The above-described phase detector 51 is incorporated into the system of FIG. 10 for controlling the thickness of a strip of sheet steel 10 in the same general fashion as described for the system of FIG. 1. The antennas 13 and 14 utilized in this phase detection system arrangement are preferably the dielectric antennas illustrated in FIG. 3. The antennas 13 and 14 are coupled to the separators 15 and 16 and which separators are provided with a signal from a signal source 12. The microwave energy from the signal source 12 functions as the reference signal and is also coupled to the phase detector 51, shown in the same schematic form as represented in FIG. 8a. The E plane arm in this instance is provided a non-reflecting termination whereby the reference signal B is derived from the side arms one and two, S-1 and S-2. The two reflected signals, A and -A, are coupled to the crystals 52 and 53 respectively by means of hybrid junctions (for purposes of isolation) as shown. The phase of the reflected signal A derived from the antenna 13 is adjusted to be 90 degrees leading with respect to the reference signal B as they arrive at crystal 52 while the phase of −A is adjusted to be (90+180 degrees) leading with respect to signal B at crystal 53. The phase relationships of the reference and reflected signals, therefore, are the same as described hereinabove. In the above description the signals A and −A were the same signal, while in the present discussion they are independent signals. The phase diagram of FIG. 9, however, still applies. To obtain these desired phase relationships for the reflected signals A and −A, a pair of adjustable phase shifters 54 and 55 are coupled to the respective separators 15 and 16.

The output signals from the crystals 52 and 53 are coupled to appropriate amplifiers 56 and 57, respectively, and the amplified output signals coupled to the difference amplifier 47 providing the difference or error signal upon comparison. The amplifier 47 is a balanced difference amplifier. The difference signal provided by the amplifier 47 is applied to a differencer or subtraction circuit 58. The differencer 58 is also provided with a reference signal representative of the desired thickness for the material 10. This reference signal is of the opposite polarity from the error signal and the resulting signal from the differencer 58 provides the control signal for the control circuit 49.

Figure 9:
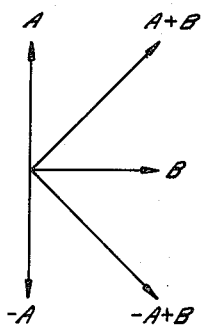
FIG. 9 is a graphic representation of a phasor diagram for the phase detector of FIG. 8.

The operation of the system of FIG. 10 will now be described. If a translation of the steel strip 10 takes place in either direction, the phasors A and −A, as shown in FIG. 9, will always rotate in opposite directions and by an equal amount to cause the magnitudes of $(A+B)$ and $(-A+B)$ to remain equal. Under these conditions the difference amplifier will ideally provide an output which is equal to zero. If the thickness $\epsilon$ of the material 10 changes, however, phasor A and −A rotate in the same direction resulting in difference magnitudes for $(A+B)$ and $(-A+B)$, and thereby, a difference or error signal is applied to the differencer 58. The differencer 58 compares the error signal with the thickness reference signal and provides a control signal representative of the difference in thickness between the measured thickness and the desired thickness of the strip 10. The control signal is applied to the roll control circuit 49 to actuate the rolls in a direction that will tend to return the material 10 to the reference thickness.

It should also be recognized that the combination of the phase and amplitude methods may be employed in accordance with the above invention. The main advantage of combining the two methods is the elimination of the directional couplers 27 and 28, utilized in the amplitude method, otherwise it appears to be inferior to the amplitude method because of a reduction of about one-half in the linear operating range. Also, although the invention has been principally described in systems for measuring thickness, the concept of this invention is applicable to measuring distances by reflecting the microwaves from the opposite sides of a reflecting surface centrally located between the two points to be measured. This method of operation may be utilized to measure the length of a bridge or changes thereof.

What is claimed is:

1. A measuring device including, in combination, first means for transmitting a signal towards one side of a reflecting surface and for receiving the signal reflected therefrom, second means for transmitting a signal towards the opposite side of the reflecting surface and for receiving the signal reflected from said opposite side, first separation means coupled to said first means for separating a signal to be transmitted from the signal reflected from said one side and providing an output signal corresponding to the reflected signal, second separation means coupled to said second means for separating a signal to be transmitted from the signal reflected from said opposite side and providing an output signal corresponding to the reflected signal, a source of signals to be transmitted coupled to the first and second separation means, first detector means having a linear region in its transfer characteristics coupled to be responsive to the output signal from said first separation means over the said linear region of its transfer characteristics and providing an output signal proportional to the distance between said first means and the one side of the reflecting surface of the material to be measured, second detector means having a linear region in its transfer characteristics coupled to be responsive to the output signal from said second separation means over the said linear region of its transfer characteristics and providing an output signal proportional to the distance between said second means and said opposite side of the reflecting surface, and means connected to be responsive to the output signals from the first and second detector means for combining the applied signals.

2. A measuring device as defined in claim 1 wherein the first and second detector means have a square law characteristic.

3. A measuring device including, in combination, first antenna means for transmitting a microwave signal towards one side of a reflecting surface and for receiving the reflected microwave signal therefrom, second antenna means for transmitting a microwave signal towards the opposite side of the reflecting surface and for receiving the reflected microwave signal from said opposite side, first separation means coupled to said first antenna means for separating a microwave signal to be transmitted from the microwave signal reflected from said one side and providing an output signal corresponding to the reflected signal, second separation means coupled to said second antenna means for separating a microwave signal to be transmitted from the signal reflected from said opposite side and providing an output signal corresponding to the reflected signal, a source of microwave signals to be transmitted from the first and second antenna means coupled to the first and second separation means, first microwave crystal detector means including a square root network coupled to be responsive to the output signal from said first separation means and providing an output signal proportional to the distance between said first antenna means and the one side of the reflecting surface, second microwave crystal detector means including a square root network coupled to be responsive to the output signal from said second separation means and providing an output signal proportional to the distance between said second means and said opposite side of the reflecting surface, and combining means connected to be responsive to the output signals from the first and second detector means for providing a signal related to the distance between the first and second antenna means.

4. A measuring device including, in combination, first means for transmitting a signal towards one side of a material to be measured and for receiving the transmitted signal reflected therefrom, second means for transmitting a signal towards the opposite side of the material to be measured and for receiving the transmitted signal reflected from said opposite side, first separation means coupled to said first means for separating a signal to be transmitted from the signal reflected from said one side and providing an output signal corresponding to the reflected signal, second separation means coupled to said second means for separating a signal to be transmitted from the signal reflected from said opposite side and providing an output signal corresponding to the reflected signal, a source of signals to be transmitted coupled to the first and second separation means, first detector means having a linear region in its transfer characteristics coupled to be responsive to the output signal from said first separation means over the said linear region of its transfer characteristics and providing an output signal proportional to the distance between said first means and the one side of the reflecting surface of the material to be measured, second detector means having a linear region in its transfer characteristics coupled to be responsive to the output signal from said second separation means over the said linear region of its transfer characteristics and providing an output signal proportional to the distance between said second means and said opposite reflecting surface of the material to be measured, a source of reference signals, and means connected to be responsive to the output signals from the first and second detector means and said reference signals for combining and comparing the applied signals.

5. A measuring device including, in combination, first means for transmitting an electrical signal towards one side of a material to be measured and for receiving the reflected signal therefrom, second means for transmitting an electrical signal towards the opposite side of a material to be measured and for receiving the signal reflected from said opposite side, first separation means coupled to said first means for separating a signal to be transmitted from the signal reflected from said one side and providing an electrical output signal corresponding to the reflected signal, second separation means coupled to said second means for separating a signal to be transmitted from the signal reflected from said opposite side and providing an electrical output signal corresponding to the reflected signal, a source of electrical signals to be transmitted coupled to the first and second separation means, first amplitude detector means having a linear region in its transfer characteristics coupled to be responsive to the amplitude of the signal from said first separation means over the said linear region of its transfer characteristics and providing an electrical output signal proportional to the distance between said first means and the one side of the reflecting surface of the material to be measured, second amplitude detector means having a linear region in its transfer characteristics coupled to be responsive to the amplitude of the signal from said second separation means over the said linear region of its transfer characteristics and providing an output signal proportional to the distance betwen said second means and said opposite side of the reflecting surface of the material to be measured, and adding means connected to be responsive to the output signals from the first and second detector means for providing a signal related to the total distance traveled by the pair of reflected signals.

6. A measuring device as defined in claim 5 wherein said source of electrical signals are modulated signals.

7. A measuring device as defined in claim 6 wherein said first and second detector means include crystal detectors and a square root network.

8. A measuring device including, in combination, first means for transmitting an electrical signal towards one side of a material to be measured and for receiving the reflected signal therefrom, second means for transmitting an electrical signal towards the opposite side of a material to be measured and for receiving the signal reflected from said opposite side, first separation means coupled to said first means for separating a signal to be transmitted from the signal reflected from said one side and providing an output signal corresponding to the reflected signal, second separation means coupled to said second means for separating a signal to be transmitted from the signal reflected from said opposite side and providing an output signal corresponding to the reflected signal, first phase shifting means responsive to said first separation means and providing an output signal having a preselected phase shift, second phase shifting means responsive to said second separator means and providing an output signal having a preselected phase shift related to the phase shift produced by said first phase shifting means, first phase detector means having a linear region in its transfer characteristics coupled to be responsive to the output signal from said first phase shifting means and the signal to be transmitted providing an output signal proportional to the distance between said first means and the one side of the reflecting surface of the material to be measured, second phase detector means having a linear region in its transfer characteristics coupled to be responsive to the output signal from said second phase shifting means over the said linear region of its transfer characteristics and the signal to be transmitted providing an output signal proportional to the distance between said second means and said opposite reflecting surface of the material to be measured, a source of signals to be transmitted coupled to the first and second separation means and the first and second phase detector means, and means connected to be responsive to the output signals from the first and second phase detector means for providing a signal related to the total distance traveled by the pair of reflected signals.

9. A thickness measuring device including, in combination, means for continuously advancing a material to be measured, first antenna means for transmitting a microwave signal towards one side of the advancing material to be measured and for receiving the reflected signal therefrom, second antenna means for transmitting a microwave signal towards the opposite side of the advancing material to be measured and for receiving the signal reflected from said opposite side, said first and second antenna means being spaced apart substantially the same distance from the opposite sides of the advancing material, first separation means coupled to said first antenna means for separating a signal to be transmitted from the signal reflected from said one side and providing an output signal corresponding to the reflected signal, second separation means coupled to said second antenna means for separating a signal to be transmitted from the signal reflected from said opposite side and providing an output signal corresponding to the reflected signal, a source of microwave signals to be transmitted from the first and second antenna means coupled to the first and second separation means, first detector means having a linear region in its transfer characteristics coupled to be responsive to the output signal from said first separation means over the said linear region of its transfer characteristics and providing an output signal proportional to the distance between said first antenna means and the one side of the reflecting surface of the advancing material, second detector means having a linear region in its transfer characteristics coupled to be responsive to the output signal from said second separation means over the said linear region of its transfer characteristics and providing an output signal proportional to the distance between said second antenna means and said opposite reflecting surface of the advancing material, a source of reference signals representative of a preselected thickness for the advancing material, means connected to be responsive to the output signals from the first and second detector means and said reference signals for combining and comparing the applied signals and providing a measurement signal therefrom related to the reference signal.

10. A thickness measuring device as defined in claim 9 wherein said means for advancing the material to be measured is adapted to control the thickness of the material, and includes means responsive to the measurement signal for continuously controlling the thickness of the advancing material.

11. A thickness measuring device as defined in claim 9 wherein said first and second detector means are amplitude responsive detectors.

12. A thickness measuring device as defined in claim 9 wherein said first and second detector means are phase sensitive detectors.

13. A method of continuously measuring the thickness of a continuously moving material independent of translatory motion and position of the material being measured, including the steps of advancing a material to be measured, continuously reflecting microwave signals from opposite sides of the material to be measured, detecting the reflected signals and providing an electrical output indication representative of the distance traveled by the reflected signals to the advancing materials, and combining the electrical output indications and providing a composite signal proportional to the total distance traveled by the reflecting signals.

14. A method of continuously measuring the thickness of a continuously moving material independent of translatory motion and position of the material being measured, including the steps of arranging a pair of microwave antennas a preselected distance apart, continuously advancing a material to be measured between the antennas, substantially simultaneously transmitting a microwave signal from each antenna towards the material to be measured and receiving the reflected signals therefrom, detecting the reflected signals and providing an electrical output indication representative of the distance traveled by the reflected signals from their respective antennas to the advancing materials, combining the electrical output indications and providing a composite signal proportional to the total distance traveled by the reflected signals, and comparing the composite signal with a signal representative of a desired thickness and providing a signal representative of their difference.

References Cited in the file of this patent

UNITED STATES PATENTS

| | | |
|---|---|---|
| 2,489,092 | Larrick | Nov. 22, 1949 |
| 2,576,772 | Bernet et al. | Nov. 27, 1951 |
| 2,640,190 | Rines | May 26, 1953 |
| 2,952,296 | Kofoid | Sept. 13, 1960 |

FOREIGN PATENTS

| | | |
|---|---|---|
| 1,165,687 | France | Oct. 28, 1958 |
| 615,667 | Great Britain | Jan. 10, 1949 |
| 337,341 | Switzerland | May 15, 1959 |

OTHER REFERENCES

Ryan et al.: Microwaves Used to Observe Commutator and Slip Ring Surfaces During Operation, Electrical Engineering, March 1954; pp. 251–255.